United States Patent [19]

Dutz et al.

[11] Patent Number: 4,825,638
[45] Date of Patent: May 2, 1989

[54] METHOD OF AND DEVICE FOR RECOVERING HEAT ENERGY OF HOT RAW GAS GERERATED A COAL GASIFICATION ARRANGEMENT OF AN ELECTRIC ENERGY GENERATING PLANT

[75] Inventors: Karl-Hein Dutz, Herten; Adolf Linke, Essen; Gerhard Wilmer, Hattingen; Michael Kuehn, Luenen, all of Fed. Rep. of Germany

[73] Assignee: Krupp Koppers GmbH, Essen, Fed. Rep. of Germany

[21] Appl. No.: 107,580

[22] Filed: Oct. 6, 1987

Related U.S. Application Data

[63] Continuation-in-part of Ser. No. 825,096, Jan. 31, 1986, abandoned.

[30] Foreign Application Priority Data

Feb. 15, 1985 [DE] Fed. Rep. of Germany ....... 3505157

[51] Int. Cl.[4] ................................................ F02C 3/28
[52] U.S. Cl. .................................... 60/39.02; 64/39.12; 122/7 R; 48/67
[58] Field of Search ................ 60/39.02, 39.12, 39.182; 122/7 R; 48/67

[56] References Cited

U.S. PATENT DOCUMENTS

| | | | |
|---|---|---|---|
| 4,202,167 | 5/1980 | Suggitt | 60/39.12 |
| 4,261,166 | 4/1981 | Mayrhofer | 60/39.12 |
| 4,261,167 | 4/1981 | Paull et al. | 60/39.12 |
| 4,478,606 | 10/1984 | Dorling et al. | 122/7 R |
| 4,488,513 | 12/1984 | Jahnke et al. | 122/7 R |
| 4,697,415 | 10/1987 | Schiffers | 60/39.12 |
| 4,707,163 | 11/1987 | Gudymov et al. | 122/7 R |
| 4,768,470 | 9/1988 | Ziegler | 122/7 R |

*Primary Examiner*—Louis J. Casaregola
*Attorney, Agent, or Firm*—Michael J. Striker

[57] ABSTRACT

In an electric energy generating plant including a coal gasification arrangement and a combined gas turbine and steam combine, hot raw gas generated in the gasification arrangement is fed via a heat-exchanging and dust separating unit into a desulfurization unit from which cool purified gas is discharged. The heat exchanging unit includes a tubular pressure resistant housing serving as a feeding passage for the hot raw gas and enclosing a coaxial arrangement of a tubular pipe-wall housing of a waste-heat recovery boiler, and pipe spirals of a raw gas/purified gas heat exchanger. The waste-heat recovery boiler delivers superheated steam to the steam turbine and the raw gas/purified gas heat exchanger delivers heated purified gas to the gas turbine.

8 Claims, 2 Drawing Sheets

METHOD OF AND DEVICE FOR RECOVERING HEAT ENERGY OF HOT RAW GAS GERERATED A COAL GASIFICATION ARRANGEMENT OF AN ELECTRIC ENERGY GENERATING PLANT

CROSS-REFERENCE TO A RELATED APPLICATION

This application is a continuation-in-part of application Ser. No. 825,096 filed Jan. 31, 1986 (abandoned).

BACKGROUND OF THE INVENTION

The present invention relates to the generation of electric energy in general, and more particularly to a method of and a device for recovering heat energy of hot raw gas generated in a coal gasification arrangement of a combined gas turbine and steam turbine electric power generating plant.

There are already known various constructions of electric power generating plants of the above-mentioned type, in which the finely granular to pulverulent coal being used as a fuel is converted in the coal gasification arrangement at a pressure exceeding 1 bar and at a temperature in excess of 1000° C. to a partial oxidation gas having combustible components consisting essentially of CO and $H_2$ and the thus obtained partial oxidation or raw gas is cooled in a waste-heat recovery boiler with simultaneous generation of steam, subsequently purified by removing particulate materials therefrom and by de-sulfurizing the same, and the thus purified gas is then combusted in a combustion chamber with attendant production of a hot combustion gas which is supplied to the gas turbine arrangement of the electric power generating plant, while the steam generated in the waste-heat recovery boiler is supplied, together with steam generated in a waste-heat recovery steam generator associated with the gas turbine arrangement, to the steam turbine arrangement.

Arrangements of the above type and methods performed thereby are already known in a number of different variations from a multitude of publications. These methods have recently gained an increased importance in view of the increasing concern for environmental protection and the discussions and legislative actions on this subject. In contradistinction to the currently predominating methods of generating electric energy by combusting fossil fuels, particularly coal, in accordance with which the fossil fuels which serve as energy sources are burned below steam-generating boilers and the steam generated in this manner is caused to expand in steam turbines for the purpose of generating electric current, the methods here under consideration are characterized by a considerably improved environmental impact. While the sulfur compounds contained in coal or other fossil fuels are converted during the burning of such fuels into sulfur dioxide which can be removed from the gaseous combustion products of conventional electric power generating plants only with a considerable effort and at a substantial cost, the sulfur compounds contained in the respective fuel are not converted into sulfur dioxide during the fuel gasification that is performed upstream of the power generating plant; rather, such compounds are at least predominantly converted into hydrogen sulfide. The latter can then be relatively easily removed from the produced raw gas by suitable physically or chemically acting means and scrubbing processes, so that the produced gas can be supplied to the electric power generating plant virtually free of sulfur and its compounds and an adverse environmental impact otherwise constituted by the discharged sulfur compounds is avoided.

During the performance of a method of the initially mentioned kind, the economy of the electric current generation depends very heavily on the utilization of the total available sensible heat energy, which must be as extensive as possible. In this connection, it is especially to be taken into consideration that, in accordance with the current state of the art, the steam turbine process has a lower efficiency than the gas turbine process. Therefore, it is important to assure that as great a proportion of the total available sensible heat energy be supplied to the gas turbine and, in this manner, the overall efficiency of the electric current generation process is improved.

In this connection, considerations on how to be able to transfer an as large as possible proportion of the sensible heat of the hot raw gas emerging from the coal gasification arrangement to the cold gas, which is supplied to the combustion chamber of the gas turbine and which has been previously purified by removal of particulate materials therefrom and by de-sulfurization, are constantly gaining in importance. Such a heat exchange process does not, in principle, create any problems as far as the purified gas is concerned, and various technical solutions have become known and have proven themselves in this context. In contradistinction thereto, however, the hot raw gas emerging from the coal gasification arrangement contains, in addition to fly ash or other entrained particles, other components which condense or precipitate from the raw gas under the given operating conditions, which results in the growth of deposits or encrustations and in other contamination or soiling of the surfaces of the heat exchanger which come into contact with the raw gas. The formation of such deposits can eventually result in a complete clogging of the raw-gas side of the heat exchanger and, of course, a correspondingly reduced effectiveness of the heat-exchange process is a direct result thereof. Experiments have shown that this problem cannot be satisfactorily solved in the long run even by the inclusion of particulate material removing arrangements upstream of the heat exchanger. Even the use of two separate heat exchangers, of which either one is in operation at a given time while the respectively other is being cleaned, does not present a practical solution to this problem, because of the high equipment and operation costs connected therewith. Finally, it is also not possible or not feasible to provide for the cleaning of the heat exchange surfaces during the continuous operation by the incorporation of cleaning apparatus in the known constructions of gas/gas heat exchangers, since no technically usable solution of this problem has been found so far, which solution would simultaneously provide for the cleaning of the heat exchange surfaces and the extraction of the precipitated contaminants during the continuous operation of the heat exchanger.

SUMMARY OF THE INVENTION

Accordingly, it is a general object of the present invention to avoid the disadvantages of the prior art.

More particularly, it is an object of the present invention to develop a method of generating electric energy in a combined gas and steam turbine electric power generating plant with a preceding coal gasification arrangement, which method does not possess the disadvantages of the known methods of this kind.

Still another object of the present invention is so to devise the method of the type here under consideration as to improve the overall efficiency of the power plant.

It is yet another object of the present invention so to perform the above method as to obtain an optimum utilization of the sensible heat of the hot raw gas generated in the coal gasification arrangement.

An additional object of the present invention is to achieve, by resorting to the method of the present invention, an optimum utilization of the sensible heat of the raw gas for the powering of the gas turbine arrangement even when the coal gasification arrangement is being operated only under partial load conditions.

A concomitant object of the present invention is to provide an electric power generating plant of the above type which is especially suited for the performance of the aforementioned method.

An additional object of the present invention is so to construct the power plant of the above type as to be relatively simple in construction, inexpensive to manufacture, easy to use, and reliable in operation nevertheless.

In pursuance of these objects and others which will become apparent hereafter, one feature of the present invention resides in a method of generating energy in a combined gas and steam turbine power plant which includes a gas turbine including a combustion chamber and a steam turbine with a steam generator, comprising the steps of providing a coal gasification arrangement with a heat recovery boiler having a housing and a row gas/purified gas heat exchanger incorporated in the housing of said boiler; partially oxidizing finely granular to pulverulent coal in said coal gasification arrangement at a pressure exceeding 1 bar and at a temperature in excess of 1000° C. to obtain hot raw gas containing combustible components essentially consisting of CO and $H_2$; cooling the hot raw gas in the heat recovery boiler; purifying the raw gas by removing particulate contaminants therefrom and by desulfurizing the same in a desulfurization unit; conveying the purified gas from said desulfurization unit to said heat exchanger and pre-heating the purified gas in said raw gas/purified gas heat exchanger to a temperature in the range between 300° and 500° C.; conveying the preheated purified gas to said combustion chamber and combusting the pre-heated purified gas in the combustion chamber to produce hot combustion gas for driving the gas turbine of said power plant; and supplying the steam generated in the heat recovery boiler to the steam turbine for driving the same.

A particular advantage of the method as described so far is that the overal efficiency and economy of the electric power generating plant is significantly improved as compared to those of the known power generating plants, owing to the fact that the sensible heat of the hot raw gas generated in the coal gasification arrangement is being utilized to the largest extent possible in the gas turbine arrangement because of the indirect transfer of this heat to the purified gas.

Inasmuch as waste-heat recovery boilers, because of their structural features and well as in view of the configuration of the pressure jacket and also the configuration and arrangement of the heating surfaces or elements, are well suited for an economical installation of cleaning apparatus therein, it is possible in accordance with the method of the present invention, in contradistinction to the known constructions of gas/gas heat exchangers, to remove contaminant deposits from the heat-exchange surfaces of the heat exchanger which come in contact with the raw gas during continuous operation by installing cleaning apparatus at relevant portions of the waste-heat recovery boiler, so that long-term uninterrupted operation of the plant is made possible. Thus, according to another aspect of the present invention, the inventive method includes the step of cleaning those heat-exchange surfaces of the raw gas/purified gas heat exchanger incorporated in the waste-heat recovery boiler which come into contact with the raw gas.

For the performance of the method according to the present invention, it is further advantageous when a waste-heat recovery boiler construction is used in which the boiler heating surfaces or elements which are arranged upstream of the raw gas/purified gas heat exchanger are so constructed that they are selectively switchable into their economy and saturated steam operating states. Then, the method of the present invention further includes the step of switching the boiler heating surfaces between their economy and saturated steam operation states. As a result of this construction, the raw gas temperature at the input of the raw gas/purified gas heat exchanger which is integrated into the waste-heat recovery boiler can be varied for adjusting the desired purified gas temperature at the outlet of the heat exchanger.

For the further optimization of the heat transfer to the purified gas, a steam-heated auxiliary heat exchanger can be arranged downstream of the waste-heat recovery boiler, and the purified gas is then caused to flow through this auxiliary heat exchanger before reaching the combustion chamber of the gas turbine. Herein, this auxiliary heat exchanger is being heated by the steam derived from the preceding waste-heat recovery boiler. In this connection, steam is being preferably used which has a temperature of between 525° and 540° C. and a pressure of 140 to 160 bar. Owing to this particular construction, it is possible to utilize an increased proportion of the sensible heat of the raw gas in the gas turbine even in extreme conditions of partial load operation of the coal gasification arrangement, that is when the amount of the sensible heat made available by the raw gas in the waste-heat recovery boiler is considerably lower than it is under normal operating conditions. Thus, another facet of the method of the present invention includes the performance of the step of additionally pre-heating the purified gas in an auxiliary heat exchanger by indirect heat exchange with steam derived from the waste-heat recovery boiler.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
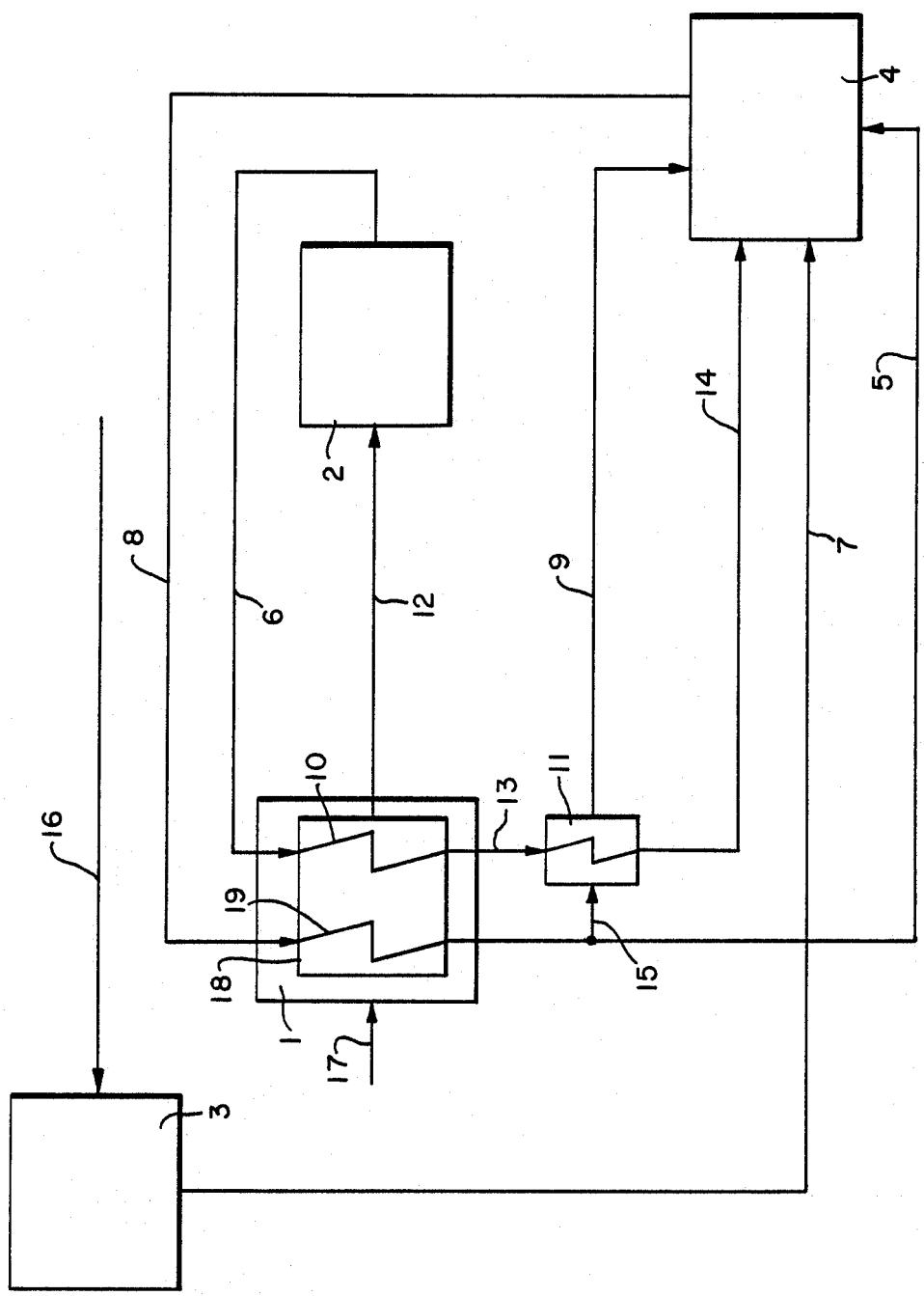
FIG. 1 is a block diagram of the electric power generation plant according to the present invention.

Referring firstly to FIG. 1, reference numerals 1 to 4 identify four different mutually interconnected plant units of the overall plant for the generation of electric energy from coal particles. The units 2 to 4 are illustrated only in block form since they are of known constructions. The plant unit 1 incorporates a coal gasification arrangement of a conventional construction connected with a waste-heat recovery boiler 19 which by itself is also of a conventional construction, and a raw gas/clean gas heat exchanger 10 which according to the invention is integrated into the waste-heat recovery boiler, 19. The plant unit 1 further includes a raw gas cleaning facility of a known construction. The plant unit 2 incorporates all arrangements which are necessary for the de-sulfurization of the raw gas. The plant unit 3 includes arrangements for performing air decomposition, while the plant unit 4 is the electric power generating unit which includes respective gas and steam turbine arrangements.

Finely granular to pulverulent coal which is being used in this instance is introduced through a coal supply line 17 into the coal gasification arrangement of the plant unit 1, where it is gasified by partial oxidation with oxygen at a pressure exceeding 1 bar and at a temperature in excess of 1000° C. The heat of reaction which becomes liberated during this partial oxidation process is being used or recovered in that the produced hot raw gas is conducted through the wasteheat recovery boiler 19 of the unit 1, to contact the raw gas/clean gas heat exchanger 10 incorporated in the boiler. Superheated steam having a pressure of up to 160 bar and a temperature of about 525° to 540° C. can be generated in the waste-heat recovery boiler, and this superheated steam is supplied through a steam pipeline 5 to the steam turbine arrangement of the electric power generating plant unit 4.

Figure 2:
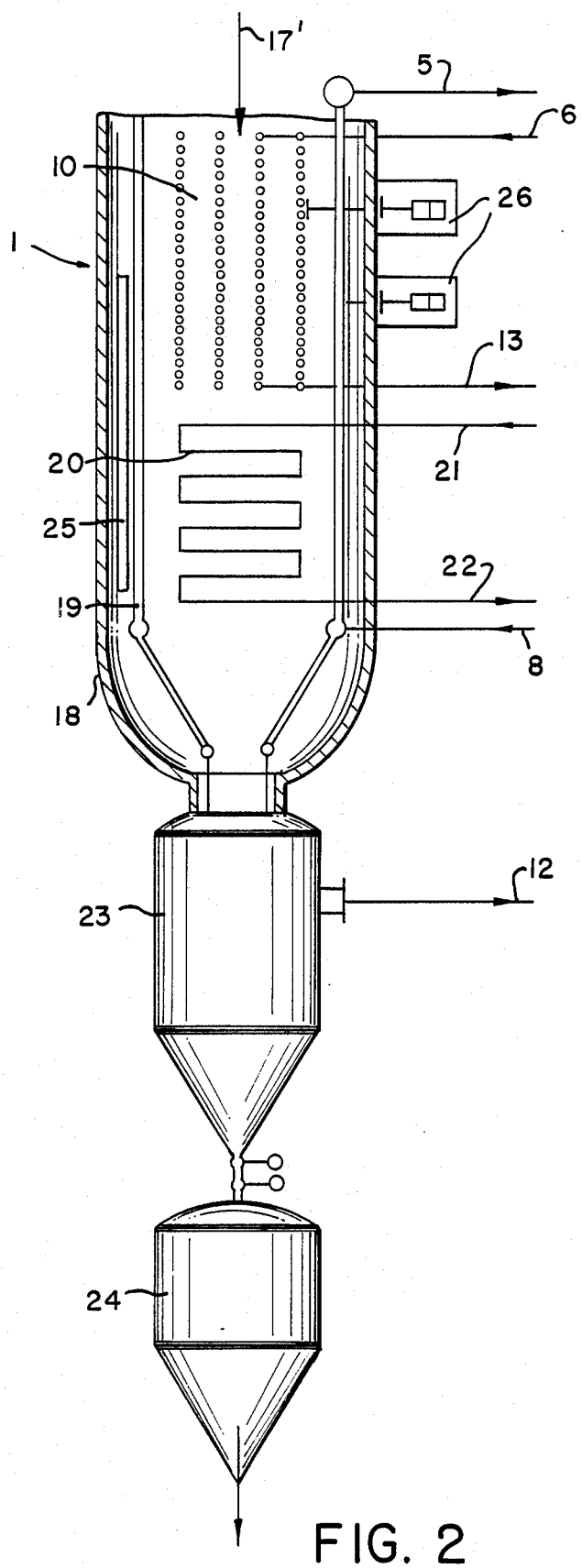
FIG. 2 is a schematic, sectional view of a part of a pressure vessel for receiving hot raw gas from a coal gasification arrangement and enclosing a heat exchanger of this invention.

With reference to FIG. 2 which illustrates the plant unit 1 in greater detail, reference numeral 10 designates a raw gas/clean gas heat exchanger shown as a box in FIG. 1. Reference numeral 18 designates a pressure vessel in which a tubular pipe wall housing 19' of the heat recovery boiler 19 is placed. Raw gas under pressure generated in a non-illustrated coal gasification arrangement is supplied into the heat recovery boiler in the direction of arrow 17'. The pressure vessel 18 is formed so that a prevailing gasification pressure is maintained therein. The tubular pipe-wall housing 19' performs the heat recovery function of the boiler. Water is fed into the boiler housing 19' via conduit 8 as also shown in FIG. 1 while super heated steam leaves the boiler housing via line 5. The raw gas/clean gas heat exchanger 10 is inserted within the central part of the tubular boiler 19. The heat exchanger 10 is formed in the known fashion of two tubular coils. These tubular coils are loaded with purified gas which in the cold state enters the heat exchanger via line 6 and is discharged from heat exchanger 10 in the heated state via conduit 60 or line 13. The external surfaces of the tubular coils of the heat exchanger 10 are rinsed with hot raw gas which flows downwardly so that a part of its sensible heat is transmitted to the clean gas. Heating elements 20 of an auxiliary waste-heat boiler are further positioned in the tubular body 19 below the heat exchanger 10. An additional part of sensible heat of the raw gas can be used due to the heating surfaces 20 for the generation of saturated steam. The required water supply into the heating elements 20 is conducted via conduit 21 while saturated steam is discharged therefrom via line or conduit 22. The cooled raw gas flows downwardly from the boiler and enters a dust separator or cyclone 23 from which raw gas freed from dust and cooled, is discharged into conduit 12 and fed to further gas processing in unit 2, as shown in the block diagram of FIG. 1. Dust separated from the raw gas flows into a dust collecting container 24 from which it is continually or discontinually removed.

In order to avoid deposits on the tubular housing 19 a soot blower is provided between the pressure container 18 and the tubular housing 19. Furthermore, mechanical cleaning or knocking devices 26 are provided in the upper portion of the boiler. These tapping devices 26 act on the tubular housing 19 and raw gas/clean gas heat exchanger 10 and serve to clean respective tubular surfaces by knocking off deposited contaminants into the stream of raw gas.

FIG. 2 illustrates only the lower and middle parts of the boiler the non-shown upper part of which in principle corresponds to the shown lower part. This means that the pressure container 18 is respectively rounded and merges into the connection for the raw gas feeding.

FIG. 2 shows a preferred embodiment of the boiler. Other constructions can be used within the limits of the present invention.

Referring back to FIG. 1, it will be seen that the raw gas which is correspondingly cooled in the waste-heat recovery boiler and in the raw gas/clean gas heat exchanger 10, after its partial purification which involves the removal of fly ash or dust and possible also other pollutants therefrom, is conducted through the partially purified gas line 12 into the plant unit 2 where de-sulfurization of this partially purified gas takes place. The cold purified gas which is obtained in this manner is conducted, through a purified gas line 6, back into the raw gas/clean gas heat exchanger 10 where it is heated by indirect heat exchange with the hot raw gas to a temperature in the range essentially between 300° and 500° C. Finally, the heated purified gas is conducted through the heated purified gas conduit 13 into a steam-heated auxiliary heat exchanger 11 which is preferably being used during a partial load operation of the coal gasification arrangement.

Steam originating in the waste-heat recovery boiler is used for the heating of the auxiliary heat exchanger 11, the steam used for this purpose being branched off from the steam pipeline 5 into an auxiliary steam pipeline 15 leading to the auxiliary heat exchanger 11. Herein, the purified gas is preheated in all to a temperature of about 500° C. and is then supplied through a pre-heated gas conduit 14 into the electric energy generating plant unit 4. Simultaneously, nitrogen from the air decomposition plant unit 3 is being supplied through a conduit 7 to the electric energy generating plant unit 4 and is mixed with the pre-heated purified gas upstream of or in the combustion chamber of the gas turbine arrangement of the plant unit 4 in such an amount that the combustion gas produced in the combustion chamber can be supplied to the gas turbine arrangement of the plant unit 4 at a temperature of between 1100° and 1500° C.

As mentioned above, the final temperature of the purified gas can be varied within the aforementioned temperature range in that economy heating surface in the waste-heat recovery boiler are switched to saturated steam heating surfaces. A conduit 8 for the boiler feed water and a conduit 9 for the steam condensate from the auxiliary heat exchanger 11 constitute partial branches of the heat-conducting connection between the plant units 1 and 4. The air needed for the air decomposition is supplied to the plant unit 3 through a conduit 16.

It will be understood that each of the elements described above, or two or more together, may also find a useful application in other types of arrangements differing from the types described above.

While the invention has been illustrated and described as embodied in a coal gasification electric power generating plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of recovering heat energy of hot raw gas generated in a coal gasification arrangement of an electric energy generating plant having a heat exchanging and dust separating unit equipped with a waste-heat recovery boiler and a raw gas purified gas heat exchanger, a raw gas desulfurization unit, and an electric power generating unit equipped with combined gas- and steam turbines, comprising the steps of arranging heat exchange surfaces of said waste-heat recovery boiler and said raw gas/purified gas heat exchanger side by side in a feeding path for said hot raw gas in said heat exchanging and dust separating unit; feeding a stream of said hot raw gas via said feeding path of the heat exchanging and dust separating unit into said desulfurization unit to generate cool purified gas; feeding water through said waste heat recovery boiler and feeding said cool purified gas through said raw gas/purified gas heat exchanger to simultaneously transfer heat energy from said stream of hot raw gas both to said water to generate superheated steam for said steam engine, and to said cool purified gas to generate heated purified gas for said gas turbine.

2. A method as defined in claim 1 further comprising the steps of arranging heating surfaces of an auxiliary waste-heat recovery boiler parallel to a portion of the heat exchanging surface of said first mentioned waste-heat recovery boiler is said feeding path of the hot raw gas down-stream of the heating surface of said raw gas/purified gas heat exchanger; and feeding water into said auxiliary waste-heat recovery boiler to generate saturated steam.

3. The method as defined in claim 1, and further comprising the step of additionally pre-heating the heated purified gas in an auxiliary heat exchanger by indirect heat exchange with a portion of the superheated steam from the heat recovery boiler.

4. The method as defined in claim 1, and further comprising the step of cleaning those heat-exchange surfaces which come into contact with the hot raw gas in said feeding path.

5. A device for recovering heat energy of hot raw gas generated in a coal gasification arrangement of an electric energy generating plant having a heat exchanging and dust separating unit equipped with a waste-heat recovery boiler and a raw gas/purified gas heat exchanger, a raw gas desulfurization unit and an electric power generating unit equipped with combined gas- and steam turbines, said heat exchanging and dust separating unit comprising a tubular pressure resistant housing for receiving at one end thereof a stream of said hot raw gas; and, coaxially arranged within said housing, a tubular pipe-wall housing of said waste-heat recovery boiler and pipe spirals of said raw gas/purified gas heat exchanger, said pipe wall housing having an inlet for feed water and an outlet for delivering superheated steam to said steam turbine, the other end of said tubular pressure resistant housing being connected to a dust separator having an outlet for feeding dust free cooled gas to said desulfurization unit, said pipe spirals having an inlet for cool purified gas from said desulfurization unit and an outlet for delivering heated purified gas to said gas turbine.

6. A device as defined in claim 5 further comprising knocking devices arranged on said tubular pressure resistant housing and being coupled to said turbine pipe spirals to knock-off deposited contaminants into said stream of the hot raw gas.

7. A device as defined in claim 6 further comprising a soot blower arranged between an inner wall of said tubular pressure resistant housing and said tubular pipe-wall housing.

8. A device as defined in claim 5 wherein inner wall of said tubular pressure resistant housing and heat exchanging surfaces of said pipe wall housing and said pipe spirals are spaced from each other to provide annular passages for said stream of hot raw gas.

* * * * *